(12) United States Patent
Kim et al.

(10) Patent No.: US 7,652,898 B2
(45) Date of Patent: Jan. 26, 2010

(54) SOFT START CIRCUIT AND POWER SUPPLY INCLUDING SOFT START CIRCUIT

(75) Inventors: Do-Wan Kim, Suwon-si (KR); Chul-Su Hong, Suwon-si (KR); Hee-Hwan Kim, Suwon-si (KR); Gun-Woo Moon, Daejeon (KR); Chong-Eun Kim, Daejeon (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 164 days.

(21) Appl. No.: 12/068,559

(22) Filed: Feb. 7, 2008

(65) Prior Publication Data
US 2009/0001944 A1  Jan. 1, 2009

(30) Foreign Application Priority Data
Jun. 27, 2007  (KR) ............... 10-2007-0063739

(51) Int. Cl.
 *H02M 7/00* (2006.01)
 *H02M 3/24* (2006.01)
(52) U.S. Cl. .................. 363/49; 363/97; 323/901
(58) Field of Classification Search ............. 363/15, 363/49, 97, 98; 323/238, 274, 275, 901, 323/908
See application file for complete search history.

(56) References Cited

U.S. PATENT DOCUMENTS 7,098,605 B2 * 8/2006 Oh .................. 315/291
7,391,630 B2 * 6/2008 Acatrinei ............. 363/89
7,400,121 B2 * 7/2008 Martins ............. 323/274
2009/0115379 A1 * 5/2009 Al-Shyoukh ........... 323/238

FOREIGN PATENT DOCUMENTS

| JP | 05-083930 A | 4/1993 |
|---|---|---|
| JP | 08-098519 A | 4/1996 |
| KR | 2005-0084792 A | 8/2005 |
| KR | 2006-0056700 A | 5/2006 |
| KR | 10-0591033 | 6/2006 |

* cited by examiner

*Primary Examiner*—Jessica Han
(74) *Attorney, Agent, or Firm*—Robert E. Bushnell, Esq.

(57) ABSTRACT

A soft start circuit is connected to a pulse width modulation controller including an oscillator, and a functionality of modulating amplitude to a pulse width and a power supply includes the soft start circuit. The soft start circuit includes a frequency controlling unit, a duty ratio establishing unit, and a variable switching unit. The frequency controlling unit generates first and second parameter signals for determining a frequency signal frequency by a power source from the PWM controller and provides them to the PWM controller. The duty ratio establishing unit generates a third parameter for determining amplitude of the frequency signal generated by the PWM controller according to a reference voltage, and provides it to the PWM controller. The variable switching unit determines whether it is a first predetermined time from a start-up state, and controls the first parameter of the frequency controller during the first predetermined time.

17 Claims, 11 Drawing Sheets

SOFT START CIRCUIT AND POWER SUPPLY INCLUDING SOFT START CIRCUIT

CLAIM OF PRIORITY

This application makes reference to, incorporates the same herein, and claims all benefits accruing under 35 U.S.C. §119 from an application for SOFT START CIRCUIT AND POWER SUPPLY INCLUDING THE CIRCUIT, earlier filed in the Korean Intellectual Property Office on 27 Jun. 2007 and there duly assigned Ser. No. 10-2007-0063739.

BACKGROUND OF THE INVENTION

1. Field of the Invention

The present invention relates to a soft start circuit and a power supply, more specifically, to a soft start circuit for controlling an output of a pulse width modulation controller, and a power supply including the soft start circuit.

2. Description of the Related Art

A power supply is provided to flat panel displays including plasma displays and liquid crystal displays (LCD), and various electrical and electronic devices that require a power source of a predetermined level. A power supply using a pulse width modulation (PWM) method among the power supplies includes a power converter and a pulse width modulation controller.

The power converter generates an output voltage based on an input voltage, and there are different kinds of power converters existing such as a half bridge converter operating with a high switching frequency and a low switching loss and operating asymmetrically, a power converter having an output inductor and such power converter including a positive clamp forward converter and a phase shifting full bridge converter, and a power converter without output inductor.

A pulse width modulation controller monitors the output of the power converter, and controls the power converter so that the output remains at a predetermined level. That is, the pulse width modulation controller controls the operation and the output of the power converter from an initial start-up operation state to a normal operation state, then to an operation stop state.

Generally, the power converter receives an operational signal having a 1:1 duty ratio according to a control operation of the pulse width modulation controller in the normal operation state. That is, the power converter performs a normal operation according to the operational signal having 1:1 duty ratio.

When the power converter operates according to the duty ratio of the normal operation state in the initial start-up state, an overload, however, may occur at an output terminal of the power converter. Therefore, a soft start method has been suggested. In the soft start method, the power converter operates with a driving signal with a low duty ratio, and the duty ratio is gradually increased and becomes equal to the duty ratio of the normal operation state.

When the duty ratio of the operational voltage signal of the start-up state is set to be lower than that of the normal operation state, a current of a primary side of a transformer increases more quickly, and has a higher maximum peak value than in the normal operation state.

In addition, according to characteristics of the power converter, a current flowing through the second side of the transformer is induced by the current flowing through the primary side thereof, and therefore waveforms of currents at the secondary side of the transformer is proportional to the waveforms of current at the primary side of the transformer. Accordingly, a current having a higher peak value may be generated at the secondary side of the transformer in the start-up state compared to the normal operation state, and therefore electrical elements may be deteriorated by the current of the high peak value of the start-up state in the power converter using the soft start method.

Particularly, compared to the power converter having the output inductor, the elements may be more easily deteriorated in the power converter without the output inductor for delaying a flow of the current induced to the secondary side of the transformer.

The above information disclosed in this background section is only for enhancement of understanding of the background of the invention and therefore it may contain information that does not form the prior art that is already known in this country to a person of ordinary skill in the art.

SUMMARY OF THE INVENTION

It is, therefore, an object of the present invention to provide an improved soft start circuit and an improved power supply including the improved soft start circuit.

It is another object of the present invention to provide a soft start circuit for generating a low peak current at a secondary side of a transformer when a power converter performs a start-up operation in a soft start method, and a power supply including the soft start circuit.

An exemplary soft start circuit according to an embodiment of the present invention is connected to a pulse width modulation (PWM) controller for generating a frequency signal, has a functionality of modulating an amplitude to a pulse width, and the soft start circuit includes a first terminal for providing a reference power source, a second terminal receiving a voltage for determining an amplitude of a frequency signal, a third terminal receiving a first value for determining a frequency of the frequency signal, and a fourth terminal receiving a second value for determining the frequency of the frequency signal. The soft start circuit includes a duty ratio establishing unit for using the reference power source to generate a first voltage, and outputting the first voltage to the second terminal, a variable switching unit including a first capacitor charged with a current provided from the first terminal and a first switch turned off by using a charged voltage of the first capacitor, and a frequency controlling unit including first and second resistors coupled in parallel to the third terminal and a second capacitor for providing a fixed voltage to the fourth terminal, allowing the current to flow to the second resistor when the first switch is turned on, and allowing the current to flow to the first and a second resistors when the first switch is turned off. An exemplary soft start circuit according to another embodiment of the present invention includes first and second resistors, a first capacitor, a third resistor, a fourth resistor, a switch, a fifth resistor, a sixth resistor, a second capacitor, a second terminal, a third terminal, and a fourth terminal. The first and second resistors are connected in series between a first terminal for receiving a reference voltage and a ground terminal. The first capacitor includes a terminal connected to the first input terminal. The third resistor includes a terminal connected to another terminal of the first capacitor. The fourth resistor is connected between another terminal of the third resistor and the ground terminal. The switch performs a switching operation according to a voltage at a node of the third and fourth resistors, and includes an output terminal coupled to the ground terminal. The fifth resistor includes a terminal connected to an input terminal of the switch. The sixth resistor is connected between another terminal of the fifth resistor and the ground terminal. The second capacitor includes a terminal connected to the ground terminal. The second terminal is connected to a node of the first resistor and a second resistor. The third terminal is connected to a node of the fifth resistor and a sixth resistor. The fourth terminal is connected to another terminal of the second capacitor. An exemplary power supply according to an embodiment of the present invention includes a power converter, an output voltage detector, a pulse width modulation (PWM) controller, a gate driver, and a soft start circuit. The power converter includes an inverting unit inverting an input direct current (DC) voltage to an alternating current voltage by using a switch, a transforming unit for transforming a voltage output from the inverting unit to a voltage of a desired level, and a rectifying unit for converting an output of the transforming unit to the DC voltage. The output voltage detector outputs a feedback voltage corresponding to an output of the power converter. The PWM controller generates a frequency signal, performs a function for modulating amplitude to a pulse width, and outputs a pulse width control signal having a duty ratio corresponding to the feedback voltage of the output voltage detector. The gate driver generates a gate driving signal according to the pulse width control signal and operates the switch of the power converter. The soft start circuit includes a first capacitor charged by a reference power source input from the PWM controller, a first switch turned off by a charged voltage of the first capacitor, and at least one first resistor connected to the first switch, and controls a frequency of the frequency signal by allowing a current to flow to the first resistor when the first switch is turned on and allowing the current not to flow to the first resistor when the first switch is turned off.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. The terms "connect" and "be connected" in the present invention means "electrically connect" and "be electrically connected". And the terms "couple" and "be coupled" in the present invention means "electrically couple" and "be electrically coupled".

Current variations of the normal operation state and the start-up state in the soft start method will now be described with reference to FIG. 1 and FIG. 2.

Figure 1:
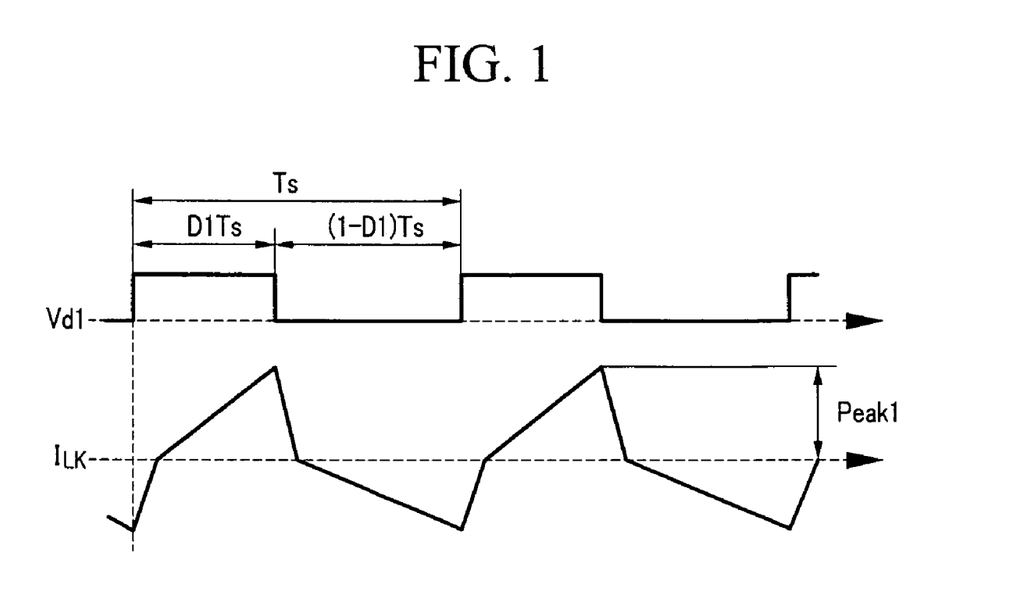
FIG. 1 shows a diagram representing an output current waveform and a duty voltage waveform in a normal operation state of a conventional power converter.

FIG. 1 shows a diagram representing an output current waveform and a duty voltage in a normal operation state of a conventional power converter. In FIG. 1, Vd1 denotes an operational voltage signal for operating a power switch to be turned on and off, and $I_{LK}$ denotes a current of a primary side of a signal transformer corresponding to a duty ratio of operational voltage signal Vd1.

In the normal operation state, operational voltage signal Vd1 includes a high voltage level time period D1Ts and a low voltage level time period (1−D1)Ts in a time period Ts, and a length of high voltage level period D1Ts is set to be the same as or close to that of low voltage level period (1−D1)Ts. Accordingly, as shown in FIG. 1, current $I_{LK}$ of the primary side of the signal transformer gradually increases in high voltage level period D1Ts and has a maximum peak value Peak1. D1 presents a duty ratio, and in this case, refers to a percentage of time when operational voltage signal Vd1 has high voltage level in time period Ts.

Figure 2:
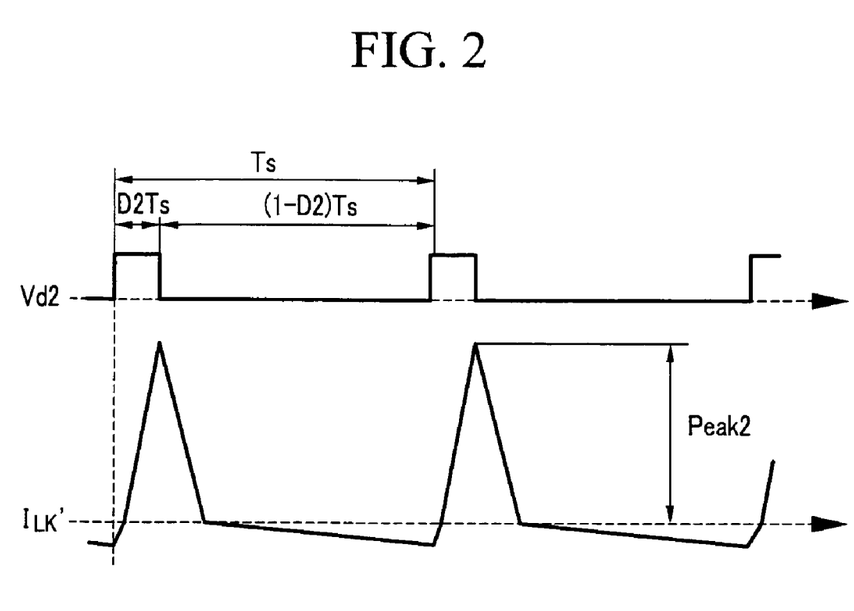
FIG. 2 shows a diagram representing the output current waveform and the duty voltage waveform when the conventional power converter performs a start-up operation in a soft start method.

FIG. 2 shows a diagram representing the output current waveform and the duty voltage when the conventional power converter performs a start-up operation with a soft start method. In FIG. 2, Vd2 denotes the operational voltage signal Vd2 for controlling the power switch to be turned on and off, and $I_{LK}'$ denotes a current of the primary side of the signal transformer corresponding to the duty ratio of operational voltage signal Vd2.

In the start-up state, operational voltage signal Vd2 includes a high voltage level time period D2Ts and a low voltage level time period (1−D2)Ts in time period Ts. The length of high level period D2Ts is set to be considerably shorter than that of low level period (1−D2)Ts to prevent a sudden overload at a secondary side. That is, duty ratio D2 of operational signal of the start-up state is set to be lower than that of the normal operation state. Accordingly, as shown in FIG. 2, current $I_{LK}'$ at the primary side quickly increases and it has a maximum peak value Peak2 since the length of high voltage level period D2Ts is short, and peak value Peak2 is higher than peak value Peak1 of the normal operation state. D2 presents a duty ratio, and in this case, refers to a percentage of time when operational voltage signal Vd2 has high voltage level in time period Ts.

A soft start circuit according to an exemplary embodiment of the present invention and a power supply including the soft start circuit will be described with reference to the FIGS.

Figure 3:
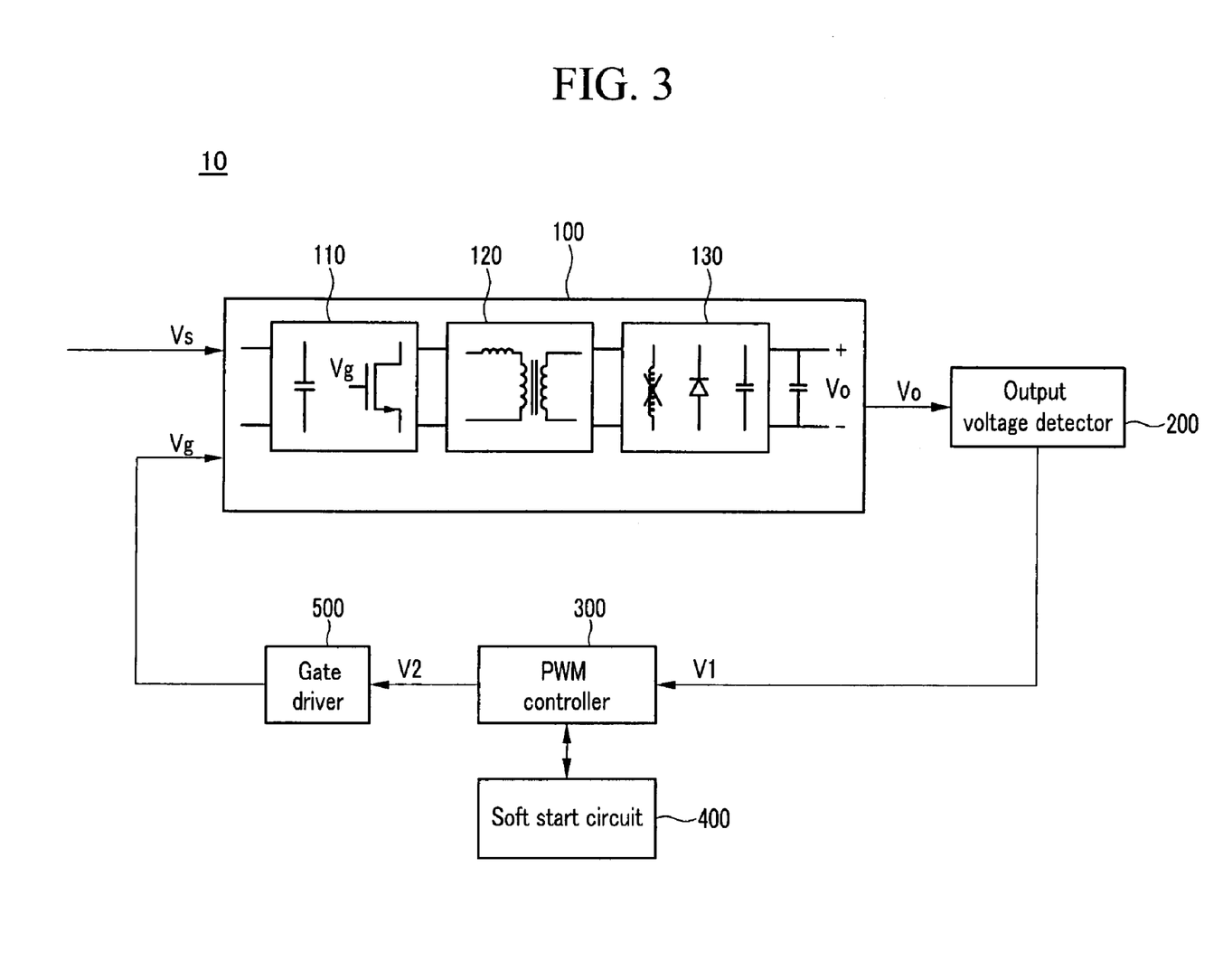
FIG. 3 shows a schematic diagram of a power supply constructed according to an exemplary embodiment of the present invention.

FIG. 3 shows a schematic diagram of a power supply according to the exemplary embodiment of the present invention. As shown in FIG. 3, power supply 10 according to the exemplary embodiment of the present invention includes a power converter 100, an output voltage detector 200, a pulse width modulation (PWM) controller 300, a soft start circuit 400, and a gate driver 500.

Power converter 100 includes an inverting unit 110 that inverts an input direct current (DC) voltage Vs to an alternating current (AC) voltage and includes a capacitor and a power switch, a signal transformer 120 for receiving an output signal of inverting unit 110 at a primary side of signal transformer 120, transforming an output signal of inverting unit 110 and outputting the transformed signal to a secondary side of signal transformer 120, and a rectifier 130 connected to the secondary side of signal transformer 120 to convert a voltage signal induced from a primary side into a DC voltage signal. Power converter 100 controls a duty ratio of on-time and off-time of the power switch (not shown in FIG. 3) of the inverting unit 110 to convert the input voltage Vs to a desired voltage. On-time here refers a time period when the power switch is turned on and off-time here refers a time period when power switch is turned off.

Output voltage detector 200 is connected to an output terminal of power converter 100, and detects an output voltage Vo of power converter 100 and outputs a feedback voltage V1 in direct proportion to output voltage Vo to PWM controller 300.

PWM controller 300 compares input feedback voltage V1 from output voltage detector 200 to a predetermined duty ratio reference voltage, and outputs a pulse width control signal V2 corresponding to a compared voltage difference to gate driver 500.

Soft start circuit 400 is connected to PWM controller 300, controls the duty ratio of pulse width control signal V2 in a start-up state so that power supply 10 performs a soft start, and controls the duty ratio of the pulse width control signal V2 in a normal operation state when a predetermined soft start time ends.

Gate driver 500 generates a gate driving signal Vg according to the pulse width control signal V2 output by the PWM controller 300, and applies the gate driving signal Vg to a gate of the power switch of inverting unit 110. Thereby, the power switch is turned on or off according to gate driving signal Vg.

A configuration of power converter 100 of power supply 10 shown in FIG. 3 will be described with reference to FIG. 4.

Figure 4:
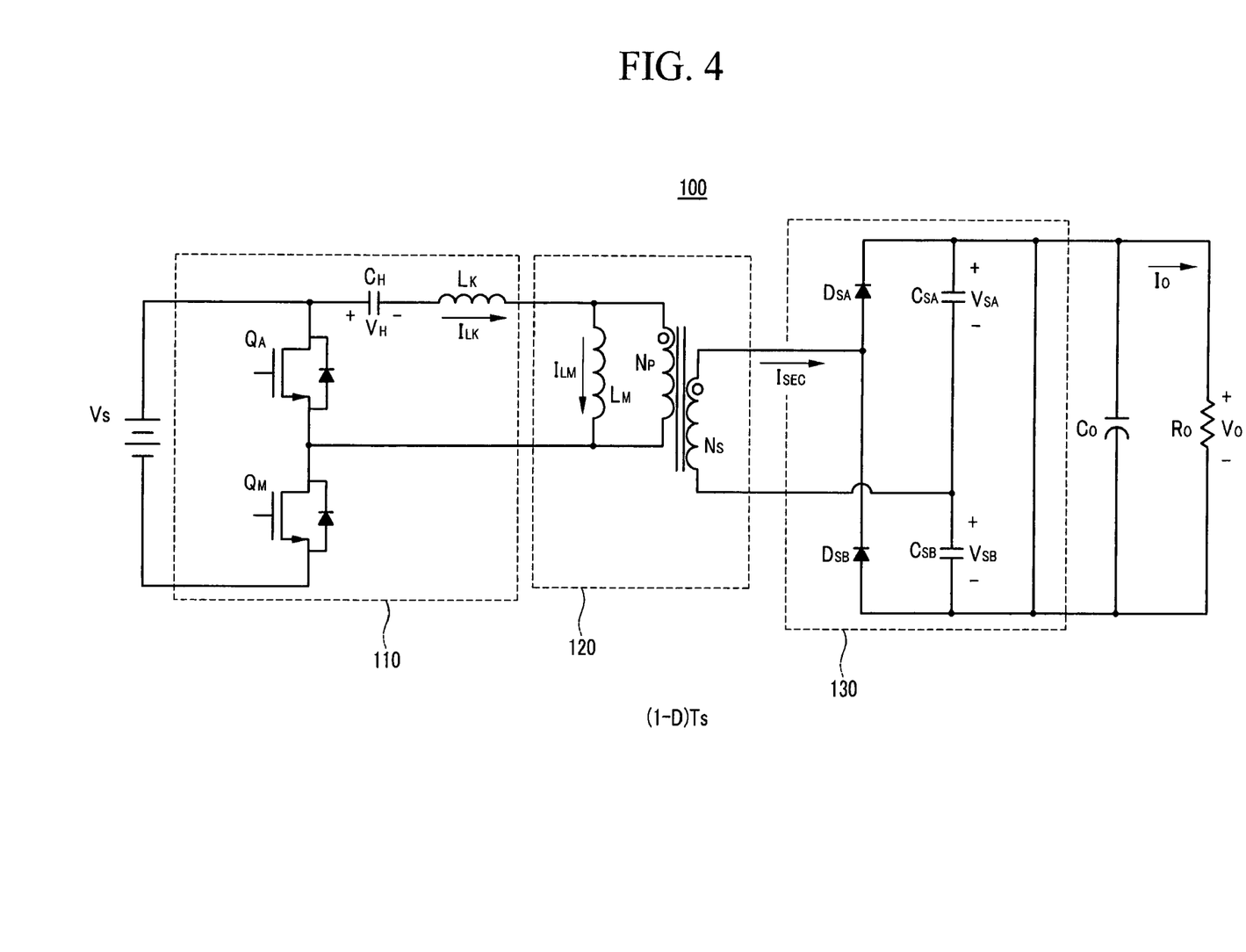
FIG. 4 shows a circuit diagram of a power converter as shown in FIG. 3.

Power converter mentioned in FIG. 3 may be power converter 100 as shown in FIG. 4. Preferably, among different kinds of power converters, a power converter without an output inductor in which an electrical current at the primary side of transformer 120 is induced to the secondary side of transformer 120 without filtering, may be efficiently used in the exemplary embodiment of the present invention.

Power converter 100 as shown in FIG. 4 is a quasi-resonant power converter having no output inductor, which was disclosed in Korean Patent Publication No. 591033 entitled "High Efficiency Power Converting Circuit without Output Inductor."

Quasi-resonant power converter 100 disclosed in Korean Patent No. 10-0591033 will now be described. Inverting unit 110 of quasi-resonant power converter 100 includes transistors $Q_A$ and $Q_M$, which are used as power switches, to be turned on and off in response to the gate driving signal Vg from gate driver 500 and converting input DC voltage Vs to an AC voltage, and a capacitor $C_H$ and an inductor LK for clamping the AC voltage converted by transistors $Q_A$ and $Q_M$. Transistors $Q_A$ and $Q_M$ are turned on alternately. Signal transformer 120 transforms a current $I_{LK}$ of inductor $L_K$ to a current $I_{SEC}$ at the secondary side according to a mutual induction operation, and a voltage formed in the secondary side varying according to a turns ratio. Turns ratio is defined as the ratio of turns of wire in the primary side to that of the secondary.

Rectifier 130 of quasi-resonant power converter 100 charges a capacitor $C_{SA}$ and a capacitor $C_{SB}$ according to a direction of the current flowing in the secondary side of signal transformer 120, and forms a predetermined charging voltage in an output capacitor $C_O$.

Accordingly, since quasi-resonant power converter 100 does not use an output inductor in rectifier 130, a switching loss may be reduced, and a high efficiency may be achieved. In quasi-resonant power converter 100, however, current waveform $I_{LK}$ of inductor $L_K$ according to the turn on/off states of transistor $Q_M$ has been shown in FIGS. 1 and 2, and therefore, a high peak of current $I_{LK}$ in the start-up state as shown in FIG. 2 is applied to output capacitor $C_O$.

Figure 5:
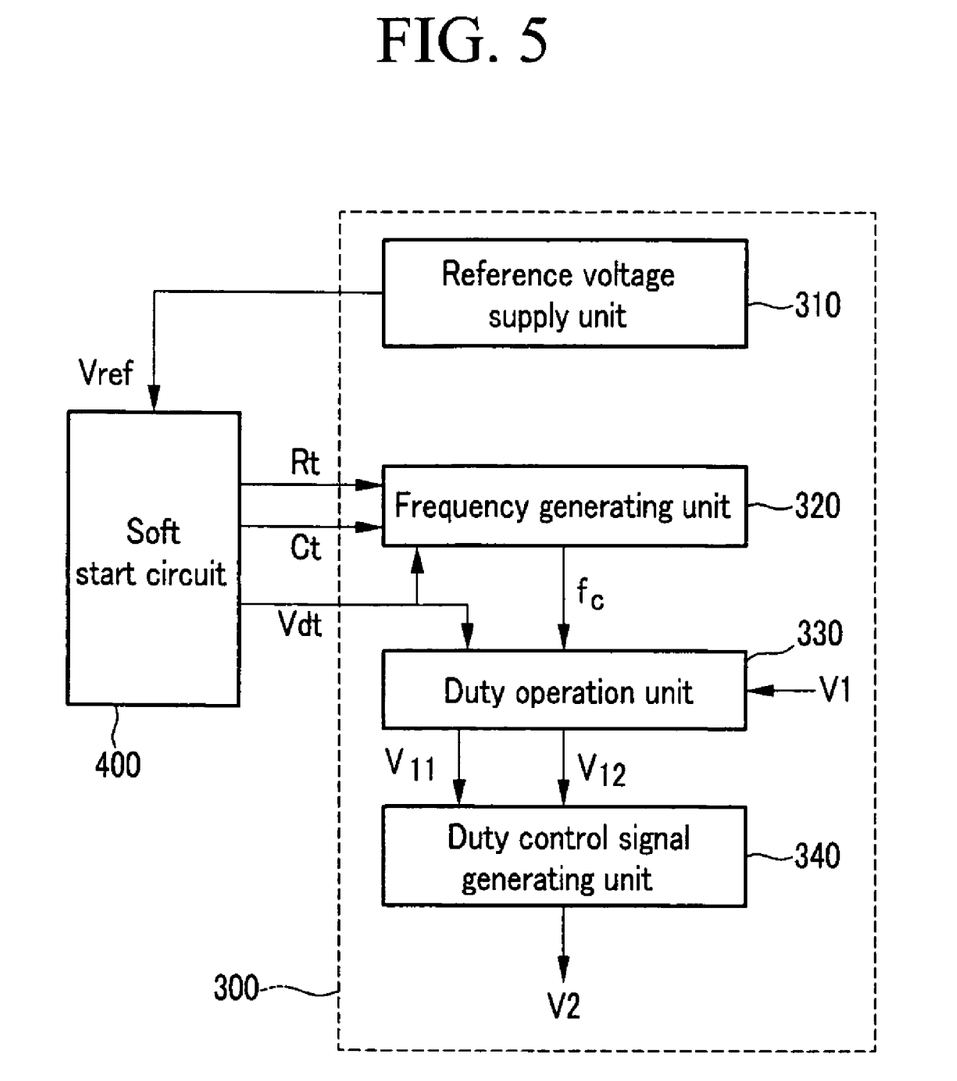
FIG. 5 shows a schematic diagram of a pulse width modulation (PWM) controller constructed according to an exemplary embodiment of the present invention.

A configuration of PWM controller 300 of power supply 10 will be described with reference to FIG. 5. FIG. 5 shows a schematic diagram of PWM controller 300 according to the exemplary embodiment of the present invention.

Here, PWM controllers including a functionality of modulating amplitude to a pulse width (i.e., a pulse width modulation function) may be used in the exemplary embodiment of the present invention, and PWM controller 300 may be formed as an integrated chip.

PWM controller 300 according to the exemplary embodiment of the present invention includes a reference voltage supply unit 310, a frequency generating unit 320, a duty operation unit 330, and a duty control signal generating unit 340.

Reference voltage supply unit 310 supplies a reference voltage Vref to soft start circuit 400 to generate a frequency signal fc of a triangular waveform or a saw tooth waveform.

Figure 6:
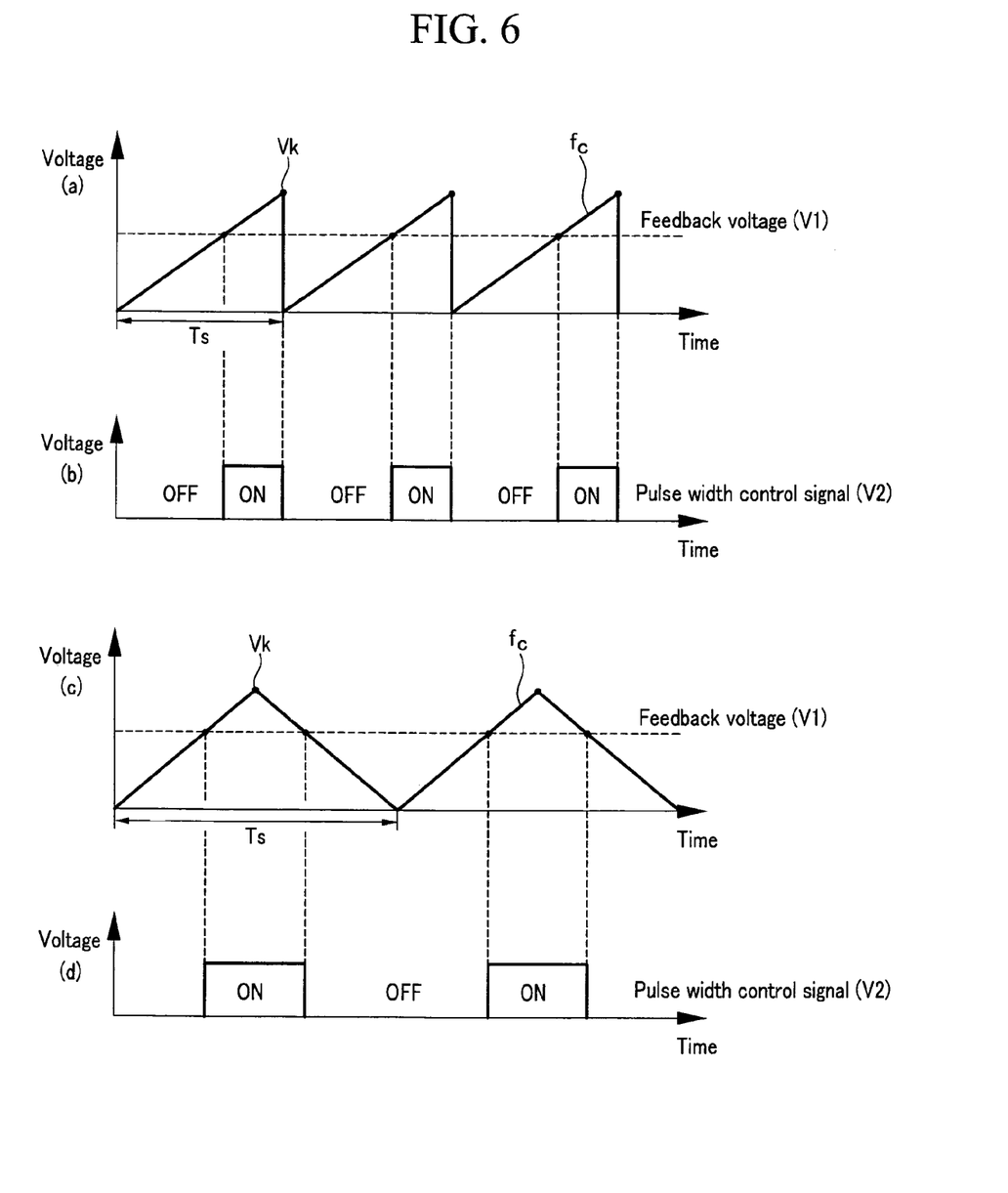
FIG. 6 shows diagram representing waveforms of a frequency signal and a pulse width control signal generated by the PWM controller as shown in FIG. 5 in accordance to an exemplary embodiment of the present invention.

Frequency generator 320 uses a first parameter Rt, a second parameter Ct, and a third parameter Vdt inputs from soft start circuit 400 to generate frequency signal fc which will be shown in FIG. 6(a), (c). In this case, when frequency signal fc denotes the generated frequency signal, the frequency of frequency signal fc is obtained by a frequency equation, i.e. fc=1/(2πRC). In this equation, parameter R denotes a resistance value, and parameter C denotes a capacitance value. First parameter signal Rt, which is a parameter signal corresponding to resistance value R in the frequency equation, presents a current value generated by a resistor, second parameter signal Ct, which is a parameter signal corresponding to capacitance value C in the frequency equation, presents a voltage value generated by a capacitor, and third parameter signal Vdt, which is a parameter for determining a peak value of the frequency signal, is a voltage value generated by a resistor. Here, the resistors determining the first parameter value Rt and the third parameter value Vdt are different from each other.

A positive saw tooth waveform shown in FIG. 6(a), (b) and a symmetrical triangular waveform shown in FIG. 6(c),(d) are applied to frequency signal fc, and a negative saw tooth waveform and a dual sloop waveform may be also applied.

The length of period Ts of frequency signal fc is determined by a resistor and a capacitor connected to an oscillator (will be shown in FIG. 8) according to the frequency equation shown before. Therefore, period Ts and a frequency of frequency signal fc generated by frequency generator 320 is determined by first parameter signal Rt and second parameter signal Ct. In a PWM circuit, the peak value of the frequency signal determines the amplitude of the frequency signal. Therefore, as shown in FIG. 6, a peak value Vk of frequency signal fc and the amplitude of the frequency signal output from frequency generator 320 is determined by third parameter signal Vdt. For example, the amplitude of the frequency signal increases when third parameter signal Vdt is high, and the amplitude of the frequency signal decreases when third parameter signal Vdt is low.

Duty operation unit 330 receives the frequency signal generated by frequency generator 320 and feedback voltage V1 output from output voltage detector 200, and compares frequency signal fc to feedback voltage V1.

FIG. 6(a), (c) show waveforms of frequency signal fc, and FIG. 6 (b), (d) show waveforms of pulse width control signal V2 corresponding to frequency signal fc as shown in FIG. 6(a), (c) respectively.

For example, as shown in FIG. 6 (a), (c), duty operation unit 330 compares frequency signal fc increasing to a peak value Vk in first period Ts (i.e. a first period voltage) to input feedback voltage V1, and generates a first voltage output V11 when the first period voltage is equal to feedback voltage V1. In addition, duty operation unit 330 compares the first period voltage to third parameter signal Vdt, and outputs a second output V12 when the first period voltage is equal to third parameter Vdt corresponding to peak value Vk.

Duty control signal generating unit 340 uses first and second outputs V11, V12 input from duty operation unit 330 to generate a PWM signal (i.e., pulse width control signal V2). In this case, duty control signal generating unit 340 toggles pulse width control signal V2 from an off-state to an on-state in synchronization with first output V11, and toggles pulse width control signal V2 from the on-state to the off-state in synchronization with second output V12. As shown in FIG. 6(b),(d), pulse width control signal V2 has a non-zero voltage value when frequency signal fc has a higher voltage value than feedback voltage V1 (i.e. on-state), and has no voltage output when frequency signal fc has a lower voltage value than feedback voltage V1 (i.e. off-state). Accordingly, duty ratio of pulse width control signal V2 is determined according to first and second outputs V11, V12.

Soft start circuit 400 of power supply 10 shown in FIG. 3 will now be described with reference to FIG. 7 and FIG. 8.

Figure 7:
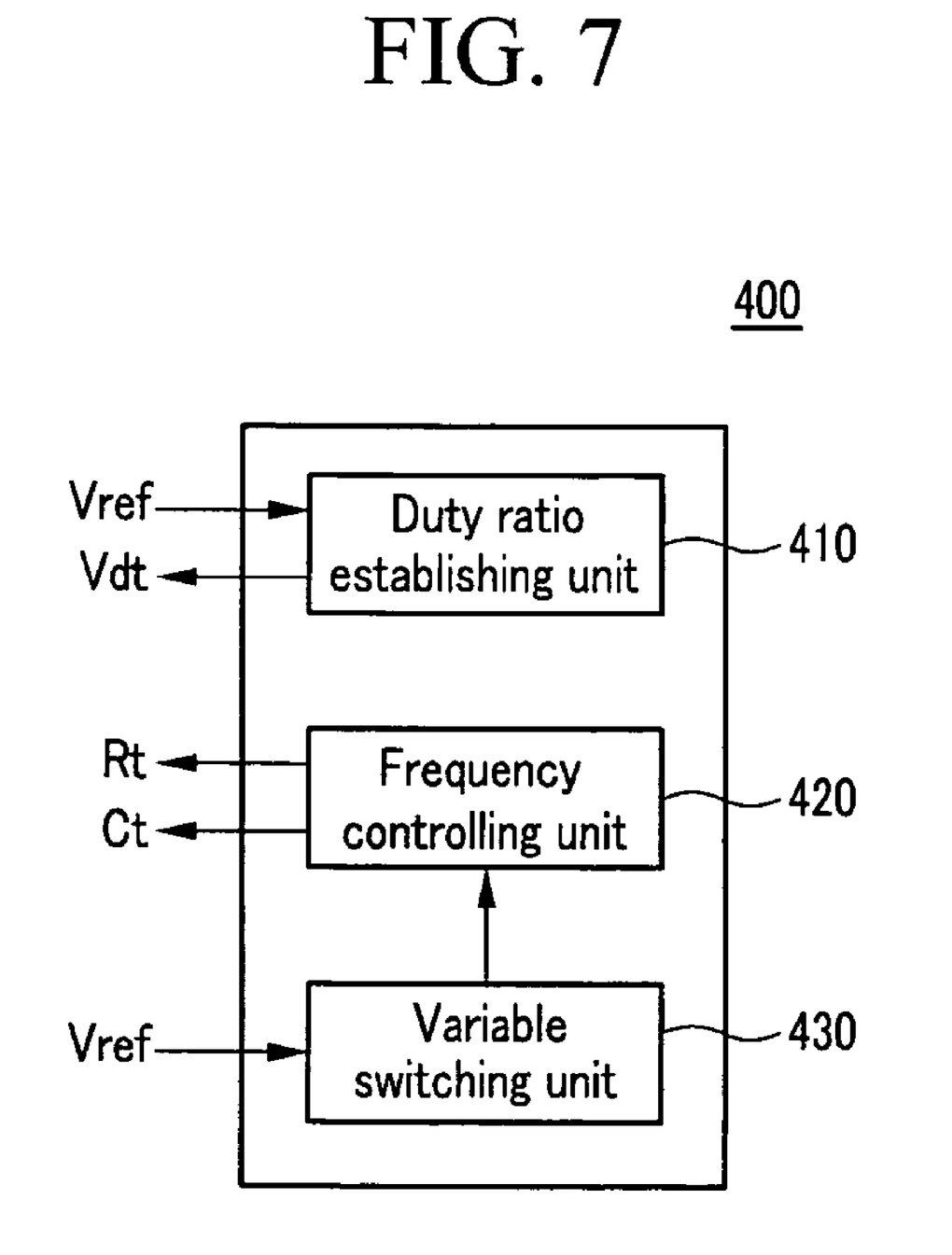
FIG. 7 shows a schematic diagram of a configuration of a soft start circuit constructed according to an exemplary embodiment of the present invention.
Figure 8:
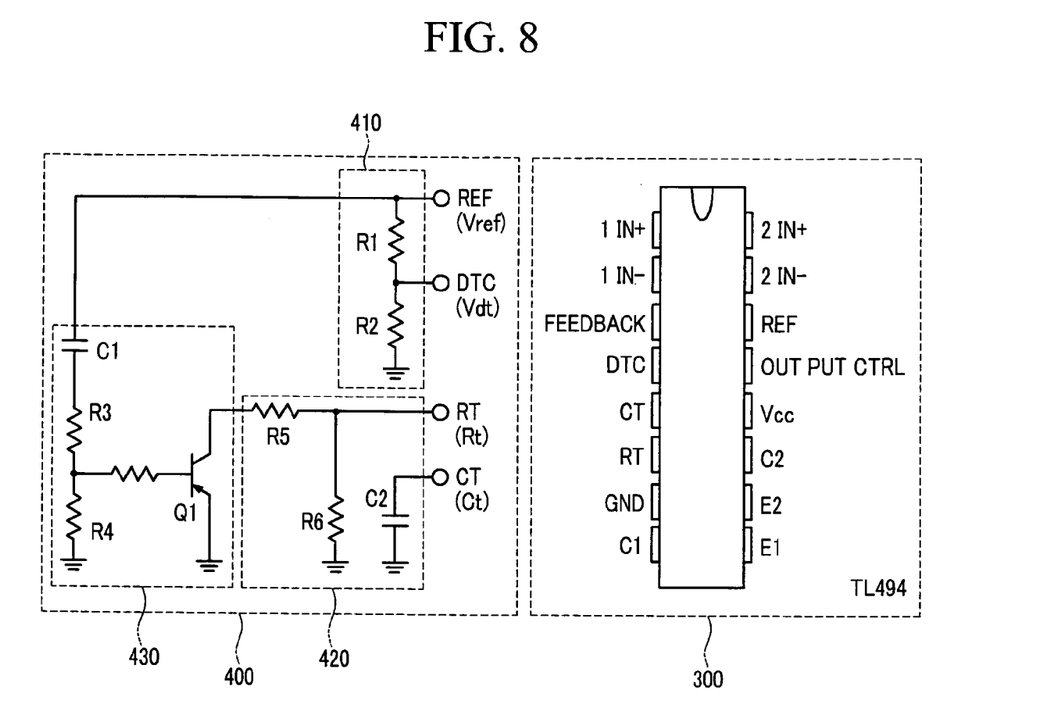
FIG. 8 shows a circuit diagram of the soft start circuit and diagram of a PWM controller constructed according to an exemplary embodiment of the present invention.

FIG. 7 shows a schematic diagram of the soft start circuit according to the exemplary embodiment of the present invention.

As shown in FIG. 7, the soft start circuit 400 according to the exemplary embodiment of the present invention includes a duty ratio establishing unit 410, a frequency controlling unit 420, and a variable switching unit 430.

A duty ratio establishing unit 410 receives reference voltage Vref from PWM controller 300 and supplies third parameter signal Vdt of a fixed level in the start-up state and the normal operation state to frequency generator 320. For example, when the duty ratio of pulse width control signal V2 in the normal operation state is 50%, third parameter signal Vdt for outputting pulse width control signal V2 of 50% duty ratio is provided.

A frequency controlling unit 420 supplies first and second parameters Rt and Ct for determining the frequency of pulse width control signal V2 to frequency generator 320, and signal levels of the supplied first parameter Rt in the start-up state and the normal operation state are different from each other. In the start-up state, frequency controlling unit 420 reduces the length of period Ts of frequency signal fc by outputting first parameter Rt with a first level for a first time which is the start-up state, and increases the length of period Ts of frequency signal fc by outputting first parameter Rt in the normal operation state which is after the start-up time. In this case, frequency controlling unit 420 outputs second parameter Ct of a fixed level in the start-up state and the normal operation state.

Variable switching unit 430 receives reference voltage Vref, and is connected to frequency controlling unit 420. In addition, variable switching unit 430 counts time from a start-up point, and controls frequency controlling unit 420 at a first time so that the level of first parameter Rt may be the second level.

Figure 9:
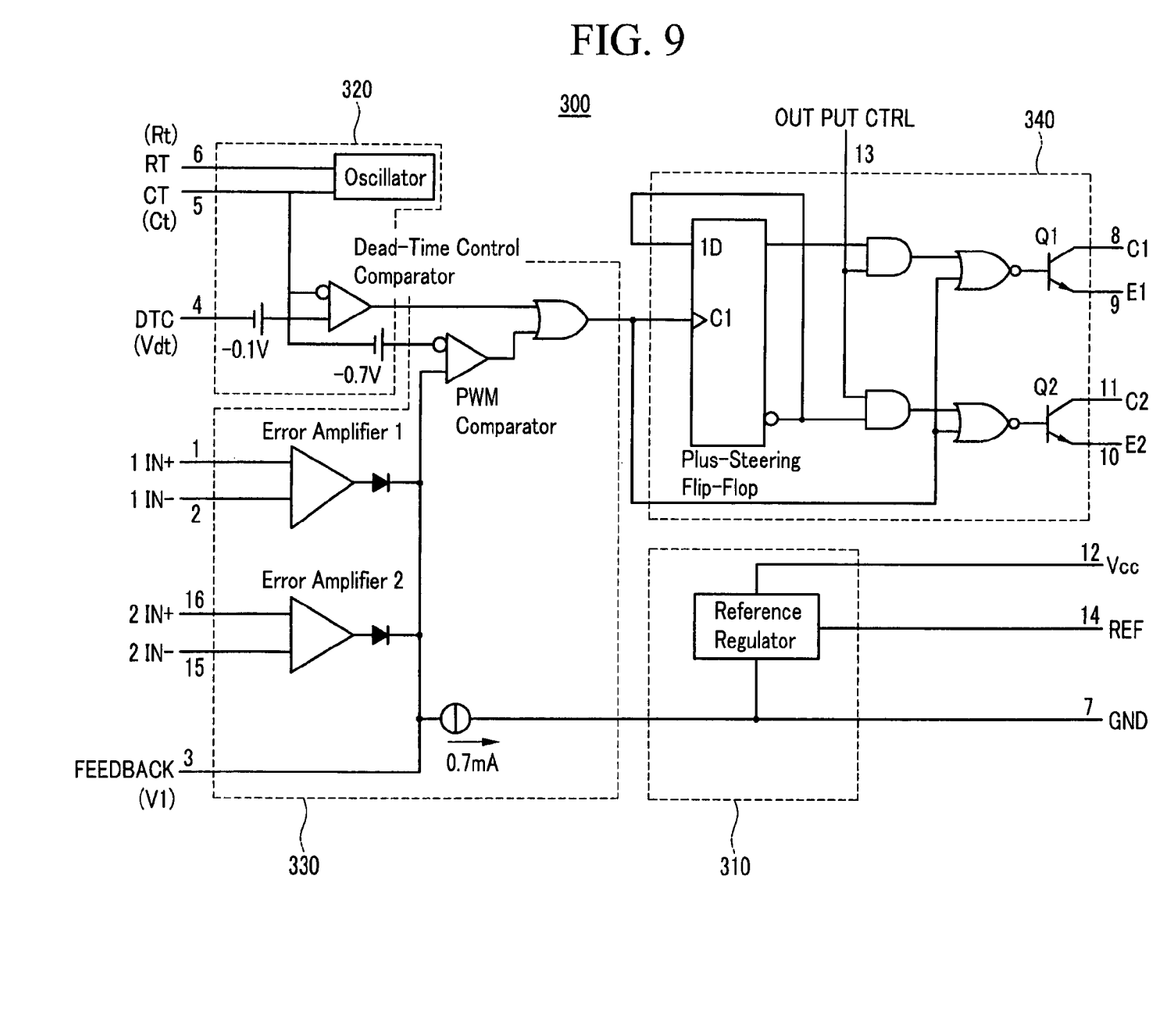
FIG. 9 shows a schematic diagram of an internal configuration of the PWM controller ready to be connected to the soft start circuit shown in FIG. 8.

Soft start circuit 400 and PWM controller 300 will be described in further detail, with reference to FIG. 8. FIG. 8 shows a circuit diagram of the soft start circuit and a PWM controller according to the exemplary embodiment of the present invention. In FIG. 8, soft start circuit 400 is used together with PWM controller 300 which is a TL494 integrated circuit (IC). The TL494 IC is a PWM IC that was developed by the Texas Instruments company in the USA, in which an internal circuit manual, specifications, and a chip pin manual have been disclosed. For better understanding and ease of description, an internal configuration of the TL494 IC along with the configuration of PWM controller 300 shown in FIG. 5 is shown in FIG. 9. As the TL494 IC shown in FIG. 9 is obvious to those skilled in the art, detailed descriptions thereof will be omitted.

Duty ratio establishing unit 410 includes a REF terminal receiving reference voltage Vref, a DTC terminal receiving third parameter signal Vdt, a resistor R1 connected between the REF terminal and the DTC terminal, a resistor R2 connected between the DTC terminal and a ground terminal, and a capacitor C1 connected to the REF terminal. Here, third parameter signal Vdt is output to the DTC terminal connected to a node of resistor R1 and resistor R2. Values of resistors R1 and R2 are respectively established to obtain third parameter Vdt corresponding to the duty ratio of pulse width control signal V2 outputted in the normal operation state. The REF terminal and the DTC terminal are respectively connected to a RFE terminal and a DTC terminal of the TL494 IC.

Frequency controlling unit 420 includes an RT terminal providing first parameter Rt to frequency generator 320, a CT terminal providing second parameter Ct to frequency generator 310, a capacitor C2 connected between the CT terminal and a ground terminal, a resistor R6 connected between the RT terminal and the ground terminal, and a resistor R5 connected to a node of the RT terminal and resistor R6 and variable switching unit 430. Here, the RT terminal and the CT terminal are respectively connected to an RT terminal and a CT terminal of the TL494 IC.

Variable switching unit 430 includes a resistor R3 having a terminal connected to the capacitor C1 of the duty ratio establishing unit 410, a resistor R4 connected between another terminal of resistor R3 and the ground terminal, a transistor Q1 having a base connected to a node of resistor R3 and resistor R4, a collector connected to a terminal of resistor R5, and the emitter of transistor Q1 connected to the ground terminal. Transistor Q1 acts as a switch according to the voltage at a node of resistors R3 and R4 and may be a PNP transistor.

An operation of the soft start circuit 400 will now be described.

In the start-up state, reference voltage Vref is applied from PWM controller 300. Thereby, the current applied from the REF terminal of soft start circuit flows to the ground terminal through a first current path formed by resistor R1 and resistor R2, and flows to the ground terminal through a second current path formed by capacitor C1, resistor R3, and resistor R4.

The current flowing through the first current path generates a voltage for dividing the reference voltage Vref at the node of resistor R1 and resistor R2 according to the resistance ratio of resistor R1 and R2, and the voltage is output through the DTC terminal as third parameter Vdt. In addition, the current flowing through the second current path charges capacitor C1 and forms a voltage at the node of resistor R3 and resistor R4 to turn off transistor Q1. Transistor Q1 is turned on at the beginning of a start-up state, and maintained a turn-on state through right before capacitor C1 finishes being charged, and is turned off immediately after capacitor C1 is charged. Here, transistor Q1 is turned off immediately after capacitor C1 is charged. Accordingly, a turn-off time of transistor Q1 is quickened when the capacitance of capacitor C1 is reduced, and the turn-off time of transistor Q1 is delayed when the capacitance of capacitor C1 is increased. Further, the current provided to the RT terminal in the start-up state flows to resistor R5 and resistor R6 while capacitor C1 is charged (i.e., while transistor Q1 is turned on), and then the current flows to resistor R6 when transistor Q1 is turned off. Here, the turn-off time of transistor Q1 is a time for starting a normal operation after the soft-start is finished.

The current provided to the CT terminal in the start-up state charges capacitor C2, and a charged voltage of capacitor C2 is output to the CT terminal as second parameter signal Ct.

Accordingly, the resistance for determining first parameter signal Rt in the start-up state is an effective resistance value of the values of resistor R5 and resistor R6 coupled in parallel, and first parameter signal Rt (i.e., the current value) is the first level in inverse proportion to the effective resistance value of resistor R5 and resistor R6 coupled in parallel. The effective resistance value of the resistance values of resistor R5 and resistor R6 coupled in parallel is less than a value of either one of resistors R5 and R6.

When the effective resistance of resistors coupled in parallel corresponding to first parameter signal Rt decreases and second parameter Ct is maintained at a predetermined value, the length of one period of the frequency signal output from frequency generator 320 of PWM controller 300 is reduced. Therefore, pulse width control signal V2 output from duty control signal generating unit 340 has the duty ratio of the normal operation state, while the frequency thereof increases.

Figure 10:
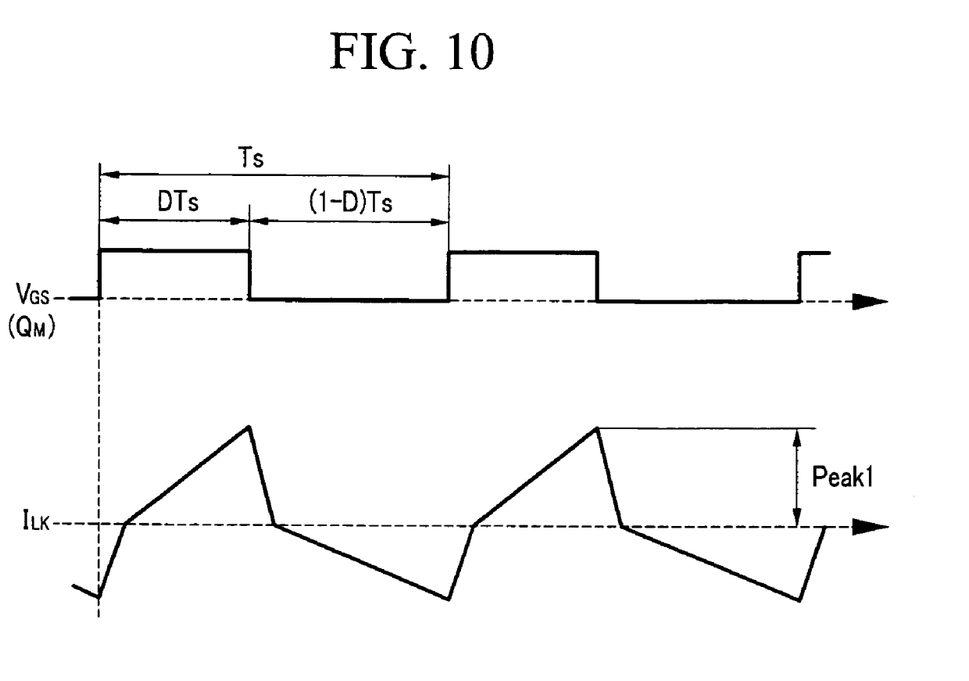
FIG. 10 shows a diagram of waveforms representing a duty voltage and an output current waveform in a quasi-resonant converter in a normal operation state for the practice of the principle of the present invention.
Figure 11:
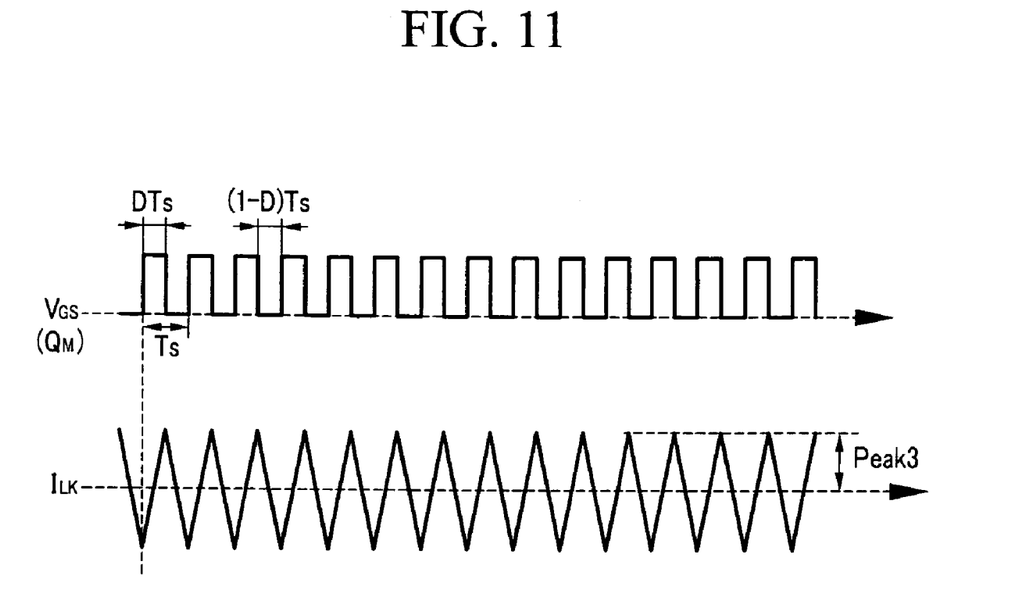
FIG. 11 shows a diagram of waveforms representing the duty voltage and the output current waveform in the quasi-resonant converter in a start-up state for the practice of the principle of the present invention.

FIG. 10 shows a diagram of waveforms representing a duty voltage and an output current waveform in a quasi-resonant converter in a normal operation state for the practice of the principle of the present invention. FIG. 11 shows a diagram of waveforms representing the duty voltage and the output current waveform in the quasi-resonant converter in a start-up state for the practice of the principle of the present invention. Here, a $V_{GS}$ indicated in FIG. 10 and FIG. 11 is a voltage between a gate and a source of the transistor $Q_M$.

When high frequency pulse width control signal V2 is output, transistor $Q_M$ of the quasi-resonant power converter 100 as shown in FIG. 4 performs a turn-on/off operation that is faster than that of the normal operation state in synchronization with the frequency of pulse width control signal V2 as shown in FIG. 11. FIG. 11 shows a diagram representing the duty ratio of the start-up state when the duty ratio of the normal operation state is 50%. In FIG. 11, the duty ratio remains at 50% in the start-up state, and the length of one period is shorter than that of the normal operation state shown in FIG. 10.

The current $I_{LK}$ of the primary inductor $L_K$ is increased by a constant rate when the transistor $Q_M$ is turned on. That is, the current $I_K$ of the primary inductor $L_K$ is proportional to the period of maintaining turn-on state of the transistor $Q_M$. A peak value Peak3 of the current waveform of the primary side inductor $L_K$ of the quasi-resonant power converter 100 is lower than the peak value Peak1 of the normal operation state, because the switching frequency of the transistor $Q_M$ in the start-up state is higher than the switching frequency in the normal operation state. As the waveforms of currents at the secondary side of the transformer is proportional to the current $I_{LK}$ at the primary side of the transformer, current $I_{SEC}$ on the secondary side of the signal transformer in the start-up state has a lower peak value than current $I_{SEC}$ in the normal operation state.

Further, an operation of soft start circuit 400 of the normal operation state and an operation of quasi-resonant power converter 100 will now be described.

Capacitor C1 is set to finish being charged at the first time. Accordingly, capacitor C1 is charged at the first time from the start-up state, and the current does not flow through the second current path including capacitor C1. The current, however, flows through the first current path, and therefore third parameter Vdt having the fixed value is output to the DTC terminal.

When the current does not flow through the second current path at the first time, a voltage is not formed at the node of resistor R3 and resistor R4, transistor Q1 is turned off, and the current flowing from the RT terminal to resistor R5 is interrupted.

Accordingly, the effective resistance for determining the first parameter Rt after the first time is the value of resistor R6, and first parameter Rt (i.e., the current value) is the second level in inverse proportion to the value of resistor R6. Here, the resistance value of resistor R6 is greater than an effective resistance value of resistor R5 and resistor R6 coupled in parallel. Therefore, after the first time, first parameter Rt is reduced from the first level to the second level. In this case, second parameter Ct output to the CT terminal is provided as a fixed value.

Accordingly, after the first time, the length of one period of the frequency signal output from frequency generator 320 is increased.

Pulse width control signal V2 output from duty control signal generating unit 340 has the duty ratio of the normal operation state and the length of one period that is longer than that of the start-up state. Transistor $Q_M$ of quasi-resonant power converter 100 performs a switching operation of the normal operation state according the pulse width control signal V2 as shown in FIG. 10. In FIG. 11, a switching signal of transistor $Q_M$ in the normal operation state, and period length is increased to be longer than the length of one period of the start-up state.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, the peak value of the current at an output terminal of the power converter in the start-up state is reduced, and therefore the power supply may be stably driven in the start-up state.

What is claimed is:

1. A soft start circuit, comprising:
said soft start circuit connected to a pulse width modulation (PWM) controller for generating a carrier signal, having a function for modulating amplitude to a pulse width, and including a first terminal for providing a reference power source, a second terminal receiving a voltage for determining an amplitude of the frequency signal, a third terminal receiving a first value for determining a frequency of the frequency signal, and a fourth terminal receiving a second value for determining the frequency of the frequency signal;
a duty ratio establishing unit for using the reference power source to generate a first voltage, and outputting the first voltage to the second terminal;
a variable switching unit including a first capacitor charged with a current provided from the first terminal and a first switch turned off by using a charged voltage of the first capacitor; and
a frequency controlling unit including first and second resistors coupled in parallel to the third terminal and a second capacitor for providing a fixed voltage to the fourth terminal, allowing the current to flow to the second resistor when the first switch is turned on, and allowing the current to flow to the second resistors when the first switch is turned off.

2. The soft start circuit of claim 1, wherein the duty ratio establishing unit includes third and fourth resistors coupled in series between the first terminal and a ground terminal, and the second terminal is coupled to a node of the third and fourth resistors.

3. The soft start circuit of claim 1, wherein the variable switching unit comprises a first capacitor including a terminal connected to the first terminal, a fifth resistor including a terminal connected to another terminal of the first capacitor, a sixth resistor connected between another terminal of the fifth resistor and a ground terminal, and a three-terminal transistor that is the first switch including a control terminal connected to a node of the fifth and sixth resistors, an output terminal connected to the ground terminal, and an input terminal connected to the first resistor.

4. The soft start circuit of claim 3, wherein the frequency controller comprises the first resistor connected between the input terminal of the first switch and the third terminal, the second resistor connected between the ground terminal and a node of the first resistor and the third terminal, and the second capacitor connected between the fourth terminal and the ground terminal.

5. The soft start circuit of claim 4, wherein the first capacitor establishes a soft-start time as a current charging time.

6. The soft start circuit of claim 1, in which said soft start circuit is connected to the pulse width modulation (PWM) controller, provides the first, second and third voltage signals to said PWM controller.

7. A soft start circuit comprising:
first and second resistors connected in series between a first terminal for receiving a reference voltage and a ground terminal;
a first capacitor including a terminal connected to the first input terminal;
a third resistor including a terminal connected to another terminal of the first capacitor;
a fourth resistor connected between another terminal of the third resistor and the ground terminal;
a switch that performs a switching operation according to a voltage at a node of the third and fourth resistors, and includes an output terminal coupled to the ground terminal;
a fifth resistor including a terminal connected to an input terminal of the switch;
a sixth resistor connected between another terminal of the fifth resistor and the ground terminal;
a second capacitor including a terminal connected to the ground terminal;
a second terminal connected to a node of the first resistor and a second resistor;
a third terminal connected to a node of the fifth resistor and a sixth resistor; and
a fourth terminal connected to another terminal of the second capacitor.

8. The soft start circuit of claim 7, wherein the switch is a three-terminal transistor turned off by using a charge voltage of the first capacitor.

9. The soft start circuit of claim 8, wherein the first capacitor establishes a soft start time as a current charging time.

10. A power supply, comprising:
a power converter including an inverting unit inverting an input direct current (DC) voltage to an alternating current voltage by using a switch, a transforming unit for transforming a voltage output from the inverting unit to a voltage of a desired level, and a rectifying unit for converting an output of the transforming unit to the DC voltage;
an output voltage detector for outputting a feedback voltage corresponding to an output of the power converter;
a pulse width modulation (PWM) controller for generating a frequency signal, performing a function for modulating amplitude to a pulse width, and outputting a pulse width control signal having a duty ratio corresponding to the feedback voltage of the output voltage detector;
a gate driver for generating a gate driving signal according to the pulse width control signal and operating the switch of the power converter; and
a soft start circuit including a first capacitor charged by a reference power source input from the PWM controller, a first switch turned off by a charged voltage of the first capacitor, and at least one first resistor connected to the first switch, and controlling a frequency of the frequency signal by allowing a current to flow to the first resistor when the first switch is turned on and allowing the current not to flow to the first resistor when the first switch is turned off.

11. The power supply of claim 10, further comprising:
a duty ratio establishing unit for generating the first voltage by using the reference power source, and outputting the first voltage to the second terminal;
a variable switching unit including the first capacitor charged with the current provided from the first terminal and the first switch turned off by using the charged voltage of the first capacitor; and
a frequency controlling unit including the first resistor and a second resistor connected in parallel to the third terminal, and a second capacitor for providing a fixed voltage to the fourth terminal, allowing a current to flow to the second resistor when the first switch is turned on, and allowing the current to flow to the first and second resistors when the first switch is turned off.

12. The power supply of claim 11, wherein the duty ratio establishing unit includes third and fourth resistors connected in series between the first terminal and a ground terminal, and the second terminal is connected to a node of the third and fourth resistors.

13. The power supply of claim 11, wherein the variable switching unit comprises the first capacitor including a terminal connected to the first terminal, a fifth resistor including a terminal connected to another terminal of the first capacitor, a sixth resistor connected between another terminal of the fifth resistor and a ground terminal, and a three-terminal transistor that is the first switch including a control terminal connected to a node of the fifth and sixth resistors, an output terminal connected to the ground terminal, and an input terminal connected to the first resistor.

14. The power supply of claim 13, wherein the frequency controlling unit comprises the first resistor connected between the input terminal of the first switch and the third terminal, the second resistor connected between the ground terminal and a node of the first resistor and the third terminal, and the second capacitor connected between the fourth terminal and the ground terminal.

15. The power supply of claim 14, wherein the first capacitor establishes a soft-start time as a current charging time.

16. A soft start circuit, comprising:
a duty ratio establishing unit receiving a reference power signal, supplied from a pulse width modulation (PWM) controller, from a first terminal, generating a first voltage signal, and outputting the first voltage to a second terminal;
a variable switching unit including a switch turned on during charging a first capacitor by a current provided from the first terminal, and turned off immediately after the first capacitor is charged; and
a frequency controlling unit including first and second resistors electrically coupled in
parallel to each other and a node of the first and second resistor electrically connected to a third terminal, and a second capacitor for providing a fixed voltage to a fourth terminal by being charged by a current provided from the fourth terminal;
said frequency controlling unit providing a second voltage signal to the third terminal; and
said frequency controlling unit allowing the current provided from the first terminal to flow to the first and second resistors when the first switch is turned on, and allowing the current to flow only to the second resistor when the first switch is turned off.

17. A power supply, comprising:
a power converter including an inverting unit inverting an input direct current (DC) voltage to an alternating current voltage by using a capacitor and a power switch, a signal transformer transforming a voltage output from the inverting unit to a voltage of a predetermined level, and a rectifier converting an output of the signal transformer to an DC output voltage;
an output voltage detector for outputting a feedback voltage corresponding to the DC output voltage from the power converter;
a pulse width modulation (PWM) controller generating a frequency signal, modulating amplitude to a pulse width, and outputting a pulse width control signal having a duty ratio corresponding to the feedback voltage provide by the output voltage detector;
a gate driver generating a gate driving signal according to the pulse width control signal and operating the switch of the power converter; and
a soft start circuit receiving a reference power signal supplied from a pulse width modulation (PWM) controller, turning on a switch during charging a first capacitor by a current provided from the first terminal and turning off the switch immediately after the first capacitor is charged, and allowing the current provided from the first terminal to flow to the first and second resistors when the first switch is turned on, and allowing the current to flow only to the second resistor when the first switch is turned off.

\* \* \* \* \*